(12) United States Patent
Shaffer et al.

(10) Patent No.: US 8,205,163 B2
(45) Date of Patent: Jun. 19, 2012

(54) INTEGRATED OUT-OF-OFFICE ASSISTANT REMINDER TOOL

(75) Inventors: Shmuel Shaffer, Palo Alto, CA (US);
Mukul Jain, San Jose, CA (US);
Sanjeev Kumar, San Francisco, CA (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 11/606,274

(22) Filed: Nov. 28, 2006

(65) Prior Publication Data
US 2008/0127231 A1  May 29, 2008

(51) Int. Cl.
*G06F 3/00* (2006.01)
(52) U.S. Cl. ......... 715/764; 715/963; 715/733; 719/328
(58) Field of Classification Search .................. 715/764, 715/963, 733; 719/328
See application file for complete search history.

(56) References Cited

U.S. PATENT DOCUMENTS

| | | | |
|---|---|---|---|
| 5,729,687 A | 3/1998 | Rothrock et al. | |
| 6,009,519 A | 12/1999 | Jones et al. | |
| 6,014,427 A | 1/2000 | Hanson et al. | |
| 6,236,854 B1 | 5/2001 | Bradshaw, Jr. | |
| 6,259,405 B1 | 7/2001 | Stewart et al. | |
| 6,342,903 B1 | 1/2002 | Fado et al. | |
| 6,501,739 B1 | 12/2002 | Cohen | |
| 6,545,596 B1 | 4/2003 | Moon | |
| 6,590,604 B1 | 7/2003 | Tucker et al. | |
| 6,608,820 B1 | 8/2003 | Bradshaw, Jr. | |
| 6,671,262 B1 | 12/2003 | Kung et al. | |
| 6,732,080 B1 * | 5/2004 | Blants | 705/9 |
| 6,785,868 B1 * | 8/2004 | Raff | 715/205 |
| 6,816,469 B1 | 11/2004 | Kung et al. | |
| 6,865,540 B1 | 3/2005 | Faber et al. | |
| 6,876,734 B1 | 4/2005 | Summers et al. | |
| 6,885,900 B1 | 4/2005 | Rybicki et al. | |
| 6,905,414 B2 | 6/2005 | Danieli et al. | |
| 6,909,778 B2 | 6/2005 | Wengrovitz | |
| 6,931,001 B2 | 8/2005 | Deng | |
| 6,931,113 B2 | 8/2005 | Ortel | |
| 6,985,745 B2 | 1/2006 | Quaid | |
| 6,987,744 B2 | 1/2006 | Harrington et al. | |
| 7,124,087 B1 * | 10/2006 | Rodriguez et al. | 705/1 |
| 2004/0162747 A1 | 8/2004 | Yeh et al. | |
| 2004/0234046 A1 | 11/2004 | Skladman et al. | |
| 2005/0135383 A1 | 6/2005 | Shenefiel | |
| 2005/0157708 A1 | 7/2005 | Chun | |
| 2005/0177622 A1 | 8/2005 | Spielman et al. | |
| 2005/0210112 A1 | 9/2005 | Clement et al. | |
| 2005/0262208 A1 | 11/2005 | Haviv et al. | |
| 2005/0288987 A1 * | 12/2005 | Sattler et al. | 705/9 |
| 2006/0031326 A1 * | 2/2006 | Ovenden | 709/206 |
| 2006/0253593 A1 * | 11/2006 | Jachner | 709/227 |
| 2007/0016465 A1 * | 1/2007 | Schaad | 705/9 |

* cited by examiner

*Primary Examiner* — Michael Roswell
(74) *Attorney, Agent, or Firm* — Baker Botts L.L.P.

(57) ABSTRACT

In one embodiment, a method includes scanning, by an automated tool, a set of application programs and/or systems associated with a user, the set including one or more action items calendared in a relevant time period that includes one or more days when the user intends to be out of the office. The one or more action items are then presented to the user via a user interface. Responsive to input received, each of one or more delegates correspondingly assigned to the one or more action items is automatically notified of the assignment. It is emphasized that this abstract is provided to comply with the rules requiring an abstract that will allow a searcher or other reader to quickly ascertain the subject matter of the technical disclosure.

15 Claims, 5 Drawing Sheets

INTEGRATED OUT-OF-OFFICE ASSISTANT REMINDER TOOL

FIELD OF THE INVENTION

The present disclosure relates to the fields of electronic scheduling, calendaring, and messaging.

BACKGROUND OF THE INVENTION

Electronic calendars commonly utilize reminder tools for such things as ensuring that a user arrives on time to meetings and to complete assigned tasks (e.g., deliver requested results/information) by their due date. Calendaring application programs typically allow users to specify a date/time that a reminder of a specific event is to be presented. For instance, the Calendar Facility of Microsoft® Outlook provides a user with the ability to schedule future meetings and to set electronic reminders of certain events (e.g., a meeting). Many people use similar messaging, calendaring, reminder and notification features incorporated in other applications, devices and systems such as email clients, personal digital assistants, phone devices/systems, etc., for the purpose of managing their work during both regular business and vacation periods. By way of example, Oracle® iProcurement purchasing/requisitioning application program includes a feature allowing procurement approval and management of requests during vacation periods. In many business organizations, it is not unusual for persons to utilize multiple different application/systems from various vendors that include or incorporate a variety of messaging, calendaring, and reminder tools.

A person who wants to leave the office on either a business trip or a vacation often faces the time-consuming task of entering each of the various different applications and systems they use, and altering the settings to reflect their out-of-office status. For instance, a person headed out of the office on vacation may be required to review their calendar or reminder utility tools to delegate responsibility for completing the tasks and action items that will become due during their absence. That person may also need to alter the settings of their voicemail system(s) to indicate that they are out of the office and their expected return date. They may also need to enable/set an automatic reply message in their calendaring application and email client programs. Additionally, that same person may also need to change the settings of their meeting scheduler, requisitioning applications, and other software applications/tools. These applications, for example, may include tools related to Human Resources, management related approvals, purchasing approvals, action item tracking, as well as messaging, calendaring, and notification tools.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION OF EXAMPLE EMBODIMENTS

In the following description specific details are set forth, such as applications, configurations, methods, etc., in order to provide a thorough understanding of the present invention. However, persons having ordinary skill in the relevant arts will appreciate that these specific details may not be needed to practice the present invention.

It should be understood that in the context of the present application a scheduler comprises hardware, software and/or firmware program designed to assist a group of colleagues to electronically schedule/calendar meetings and other appointments. The scheduler program allows members of a group to view each others' calendars so that they can choose a convenient interaction time. Similarly, an electronic calendar may comprise either a local application or client program running on a network node (i.e., a PC) or web-based tool running on a server for on-line calendar administration. Calendaring functions may include scheduling available time and/or work of a user. A user is simply a person who uses a calendar client to manage his/her personal calendar.

Figure 1:
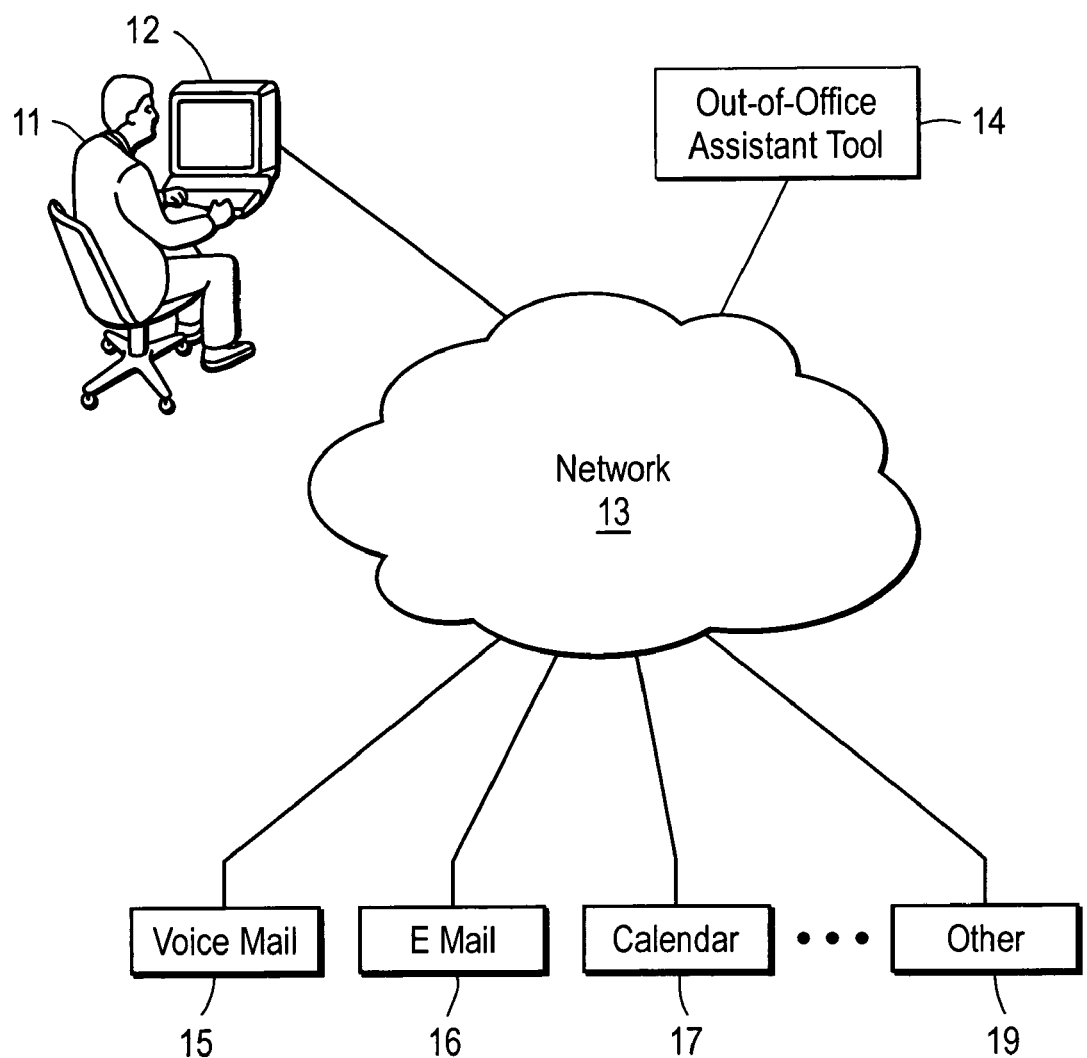
FIG. 1 illustrates an example system for managing reminders and delegating action items for a user who is planning to be out of the office.

FIG. 1 illustrates an example system for managing reminders and delegating action items for a user 11 who is planning to be out of the office. User 11 is shown using an endpoint 12 (e.g., a PC) to access various applications/utilities 15-19 via network 13, and also gateway out-of-office assistant (OoOA) tool 14. OoOA tool 14 comprises a logical entity that may reside on a variety of different nodes connected with network 13. One function of OoOA tool 14 is to scan through calendared items in the various applications/utilities 15-19 and flag items that will become due during (or shortly thereafter) the time that the user is out of the office. Network 13 may comprise an enterprise intranet, an Internet Protocol (IP) network, or any communications network capable of transmitting disposition commands and instructions to the various applications/utilities 15-19 shown connected with network 13 via OoOA gateway tool 14. The signaling path utilized for transmission of disposition commands, messages, and signals may be across any network resources.

It is appreciated that other embodiments may be configured with each of the applications/utilities 15-19 connected directly with OoOA tool 14, or, alternatively, running as executable code on PC 12. In one example embodiment, OoOA 14 may reside on endpoint 12. User 11, for instance, may access OoOA tool 14 prior to leaving the office on a business or personal trip. That is, endpoint 12 may be configured to run email client 16, voicemail messaging system 15, calendaring application 17, as well as various other applications 19 either directly or via network 13.

In a specific embodiment, the present invention may be implemented by software or hardware (firmware) installed in an endpoint device (e.g., PC 12), a server, scheduler, or some other calendaring system component, including an application utilized for scheduling, calendaring, and/or messaging. Practitioners in the art will understood that the software or firmware installed in the systems and components mentioned above may be adapted or modified to implement the functions and capabilities described herein.

In still other cases, PC 12 may run a software program that generates a graphical user interface (GUI) which comprises a collaborative web-based application that is accessed by the browser software running on the user's PC. In other instances, the GUI may comprise a downloaded application, or other forms of computer-executable code that may be loaded or accessed by PC 12. For instance, the software code for implementing the GUI may be executed on a server connected to network 13 and accessed by user 11 for the purpose of utilizing the features provided therein. Similarly, OoOA tool 14 and each of the applications/utilities 15-19 shown in FIG. 1 may reside upon and be executed by one or more network node devices, e.g., a server.

Each network node, including endpoint 12, includes a processor and executable code that supports the functionality described below. Other endpoint devices not specifically shown in FIG. 1 that may be used to access or run tool 14 and applications/utilities 15-19 may reside on a network node such as a personal digital assistant (PDA), a laptop or notebook computer, or any other device, component, element, or object capable of initiating or participating in voice or packet-data exchanges via network 13 in accordance with the protocols and methods described herein.

Figure 5:
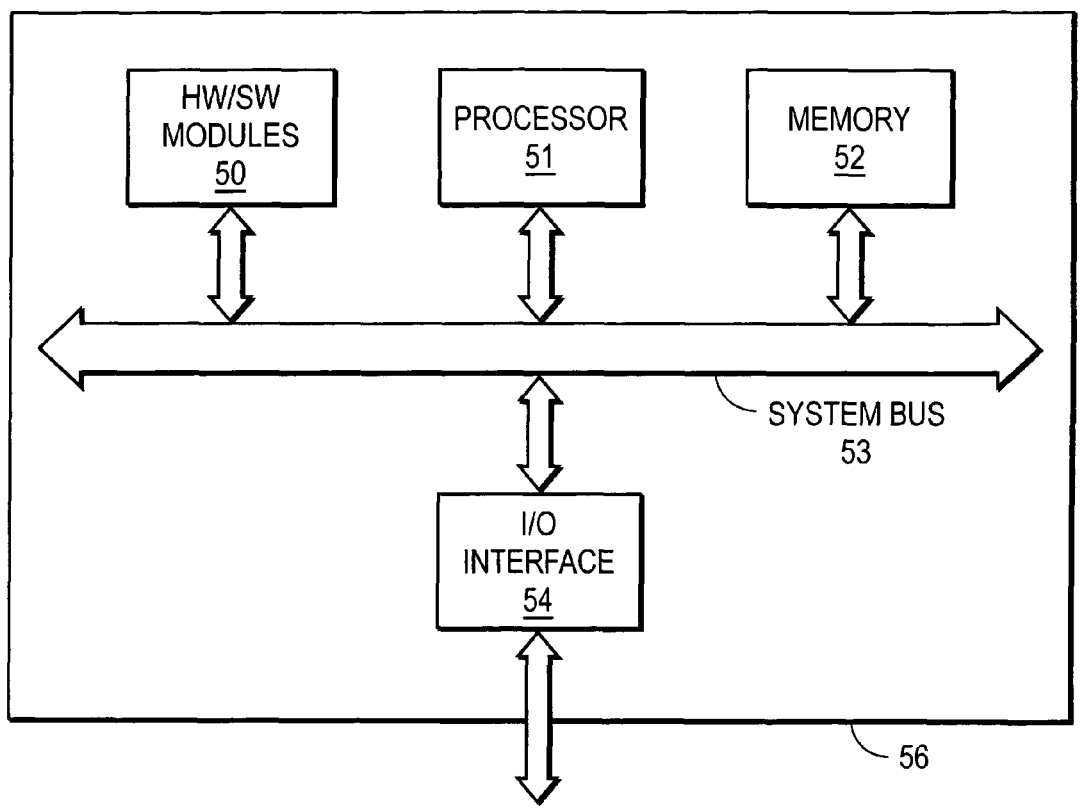
FIG. 5 illustrates an example network node.

FIG. 5 is a generalized block diagram showing an example network node 56, such as may comprise any of the nodes shown or described in conjunction with FIG. 1. Node 56 includes a processor subsystem 51 coupled with a memory unit 52, one or more hardware/software modules 50, and an input/output (I/O) interface 54 via a system bus 53. Modules 50 may include software, firmware, or logic embedded in hardware for implementing any of the functions described herein, e.g., those functions associated with delegation of action items and attendance at meetings for a user planning to be out of the office, including selection of delegates, sending of text/voice messages, and setting calendar reminders.

It is appreciated that any scheduling, calendaring, and/or reminder system utilized by or in conjunction with node 56 may comprise separate hardware devices coupled to the system bus 53, or, alternatively, implemented as software programs or modules 50 that run on one or more processors of subsystem 51. In other words, the scheduling, calendaring, reminder and other management functions may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

Figure 2:
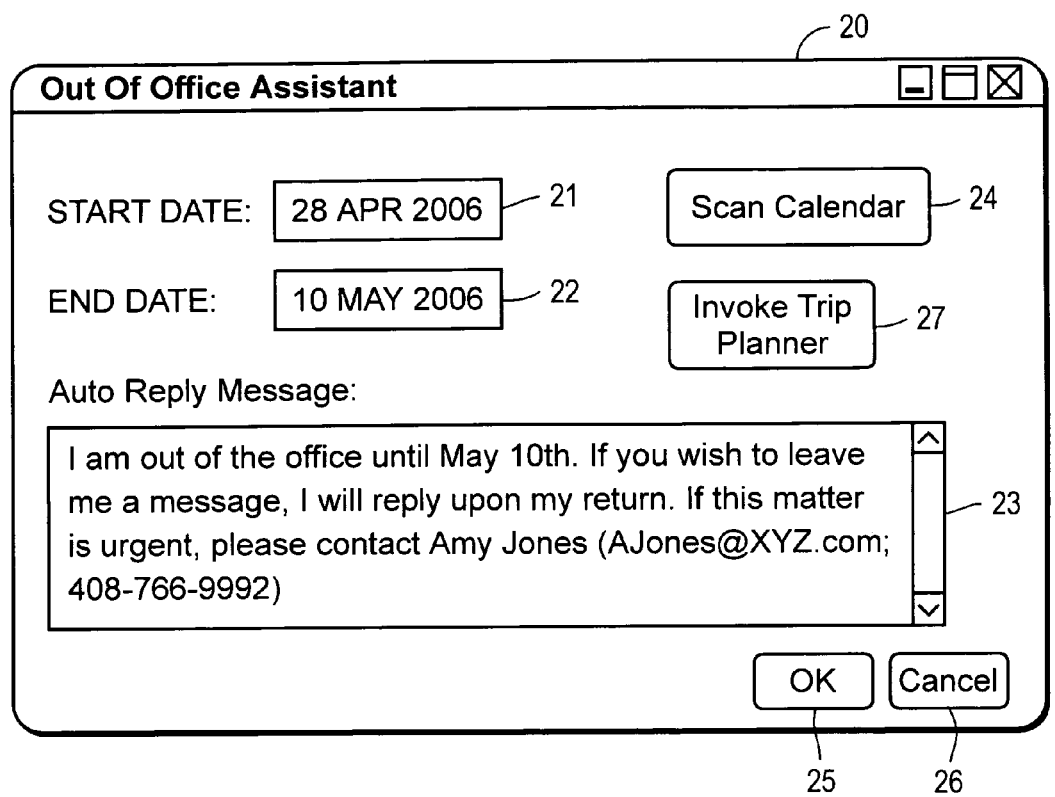
FIG. 2 illustrates an example graphical user interface (GUI) associated with an out-of-office assistant (OoOA) utility.

FIG. 2 illustrates an example graphical user interface (GUI) associated with an out-of-office assistant (OoOA) utility tool. A user may invoke the OoOA tool in order to specify that he intends to be out of the office for a determined period of time, e.g., 10 days, and then delegate actions that may become due while he is away. FIG. 2 shows a GUI window 20 that includes start date and end date data entry fields 21 & 22 respectively including the entered dates of Apr. 28, 2006 and May 10, 2006. Also shown is an auto-reply message text entry field 23 that allows a user to enter an automatic message to be played out (either as text or speech, via a standard text-to-speech converter) to persons attempting to contact the user during the user's absence. By way of example, the message entered in field 23 by a user may be played out as a prompt in the user's voicemail messaging system or as an automatic reply message sent by the user's email client. In the example of FIG. 2, the text message shown in field 23 includes the user specified return date, and contact details of a proxy (Amy Jones) to handle urgent matters in the user's absence.

Clicking the "OK" icon button 25 causes the information included in fields 21-23 to be stored in a database and automatically applied to the user's voicemail system and email client. In this example, the user may select or click on "Cancel" button 26 in order to exit the OoOA utility without saving any information previously entered. The example window 20 of FIG. 1 is also shown including a trip planner button 27, the function of which will be described in detail below.

Window 20 also includes a disposition command button (icon) 24 that may be clicked-on or otherwise selected by a user to cause the OoOA tool to automatically scan through the user's calendar and other application programs/systems having calendaring, messaging, and reminder features. The purpose of the scan is to open action items that will become due during the user's absence, or shortly thereafter upon his return. The scan may also flag scheduled meetings that the user has been invited to attend during the user's planned trip out of the office.

Figure 3:
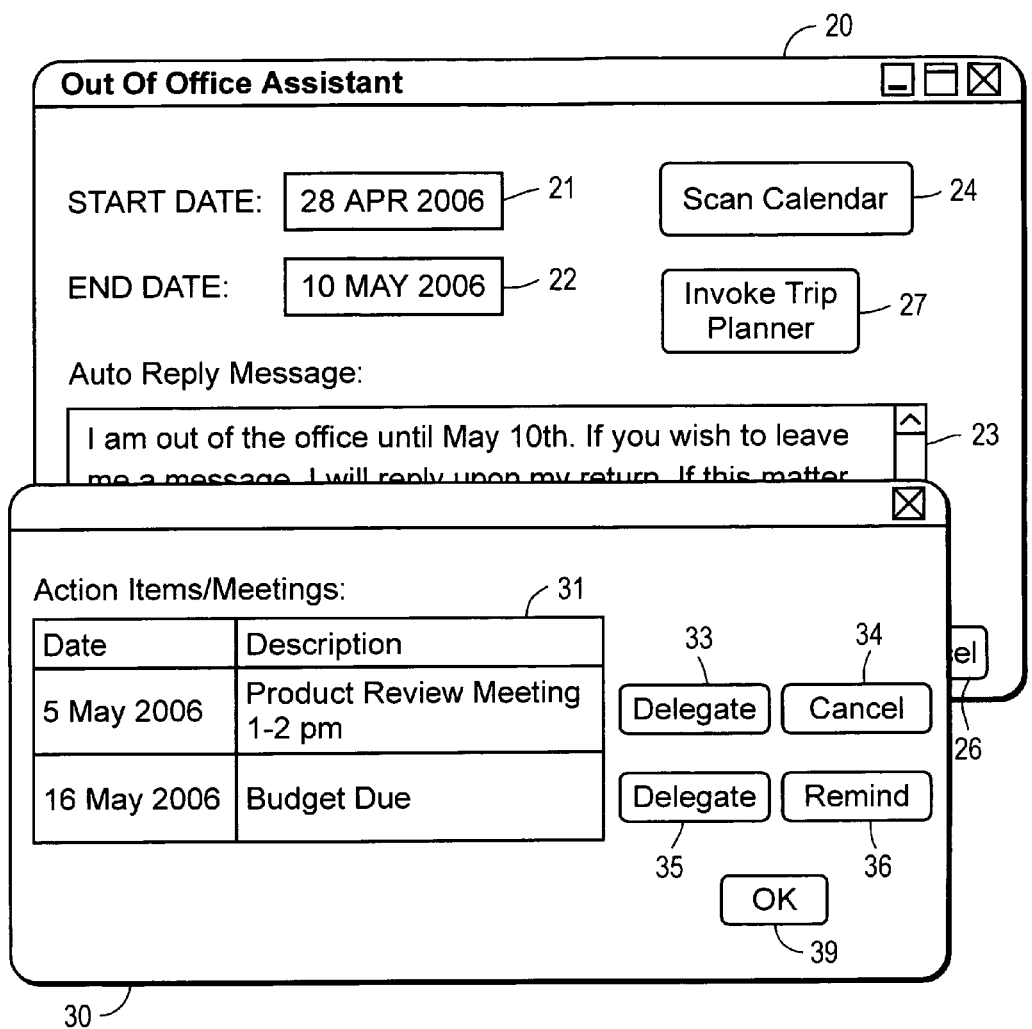
FIG. 3 illustrates the example graphical user interface (GUI) of FIG. 2 after a calendar scan option has been invoked.

FIG. 3 illustrates the example graphical user interface (GUI) of FIG. 2 after a calendar scan option has been invoked by selecting/clicking button 24. As can be seen, a pop-up window 30 is presented to the user, which window includes a box 31 listing the date and a description of the action items due and meetings scheduled during the time period specified by respective start & end date fields 21 & 22, as well as any items due shortly after the specified end date. In this example, the user has been invited to attend a product review meeting scheduled for May 5, 2006. Additionally, the user has a due date of May 16, 2006 to submit a budget. On the right-hand side of each entry in box 31 are disposition command buttons that allow the user to take appropriate action with respect to each entry.

For instance, a "Delegate" button 33 and a "Cancel" button 34 are shown adjacent the May 5th meeting entry. Likewise, a "Delegate" button 35 and a "Remind" button 36 are shown adjacent the May 16th action item entry. By pressing/selecting button 33 the user may nominate one or more delegates to attend the meeting in his place (e.g., via another pop-up window) while the user is away. For example, an email message may be automatically sent to the nominated delegate requesting that he attend the scheduled meeting as the user's proxy. Pressing/selecting button 34 cancels the user's attendance at the meeting, resulting in an automatic notification message being sent back to the scheduler and/or the meeting organizer and other attendees.

Similarly, clicking on button 35 gives the user the option to assign or delegate the task of preparing the budget to another person. A nominated delegate is automatically notified of the assigned action item along with information (e.g., attachments, assigning supervisor contact details, links, etc.) helpful or necessary to complete the task. Button 36 may be clicked/selected by the user in order to set an automatic reminder in the OoOA tool. For instance, the user may want to be reminded of the due date immediately upon his return (May 12th) to insure that the task is being properly carried out by his delegate. When the user has completed his delegations and/or other actions related to each entry, he may click the "OK" button 39 to close window 30 and have his commands/actions stored and executed (either immediately or at a later time) by the OoOA tool.

It is appreciated that the number and type of commands available to the user with respect to each action item/meeting listed in box 31 may vary depending on specific implementation. Additionally, the action item listing presented in box 31 may include a wide range of tasks and responsibilities that normally fall within the job duties of the end-user as per their job description. For instance, the listing may include authorization item entries for delegating authorization of purchase orders, account payments, vacations of other employees, handling certain client calls, and other actions that require the nomination/appointment of a proxy.

Furthermore, it should be understood that the calendar scanning function may itself be automatically invoked, e.g., in response to the user entering start and end dates in fields 21 and 22, respectively. The listing of action items due in the time period after the end date of the user's trip should also be understood as an optional feature. In other words, certain embodiments may only list action items due during the period of absence. In cases where action items are listed for a time period after the end date of the user's trip, the length of time (after the return date) may be predetermined by a user preference setting associated with the OoOA utility or any one of the systems/applications scanned and controlled by the OoOA tool. For instance, the preparation time needed to complete a budgeting task may be preset as two weeks, such that any trip ending within the two week period prior to the budget due date is automatically flagged by the OoOA tool and included in the listing of box 31.

In the embodiment shown in FIG. 2, the OoOA tool is also integrated with a trip planning utility that may be used by employees of the company to make travel arrangements, e.g., purchase airline tickets, reserve a rental car, book a hotel, etc. In a specific implementation, a reminder utility is also integrated with the trip planning and ticket ordering utility.

To invoke the trip planning/ticket ordering utility the user selects/clicks on button 27, which results in a GUI window opening to the trip planning utility on the user's PC. In a variation of this embodiment, anytime an employee uses the trip planner utility to order airline tickets or book a hotel, the OoOA utility tool is automatically invoked to make sure that all action items/meetings are properly handled and/or delegated prior to purchasing tickets or otherwise booking the user's trip. This provides a mechanism for ensuring that action items due during a user's absence from the office are properly treated before he leaves on his business trip or vacation.

Figure 4:
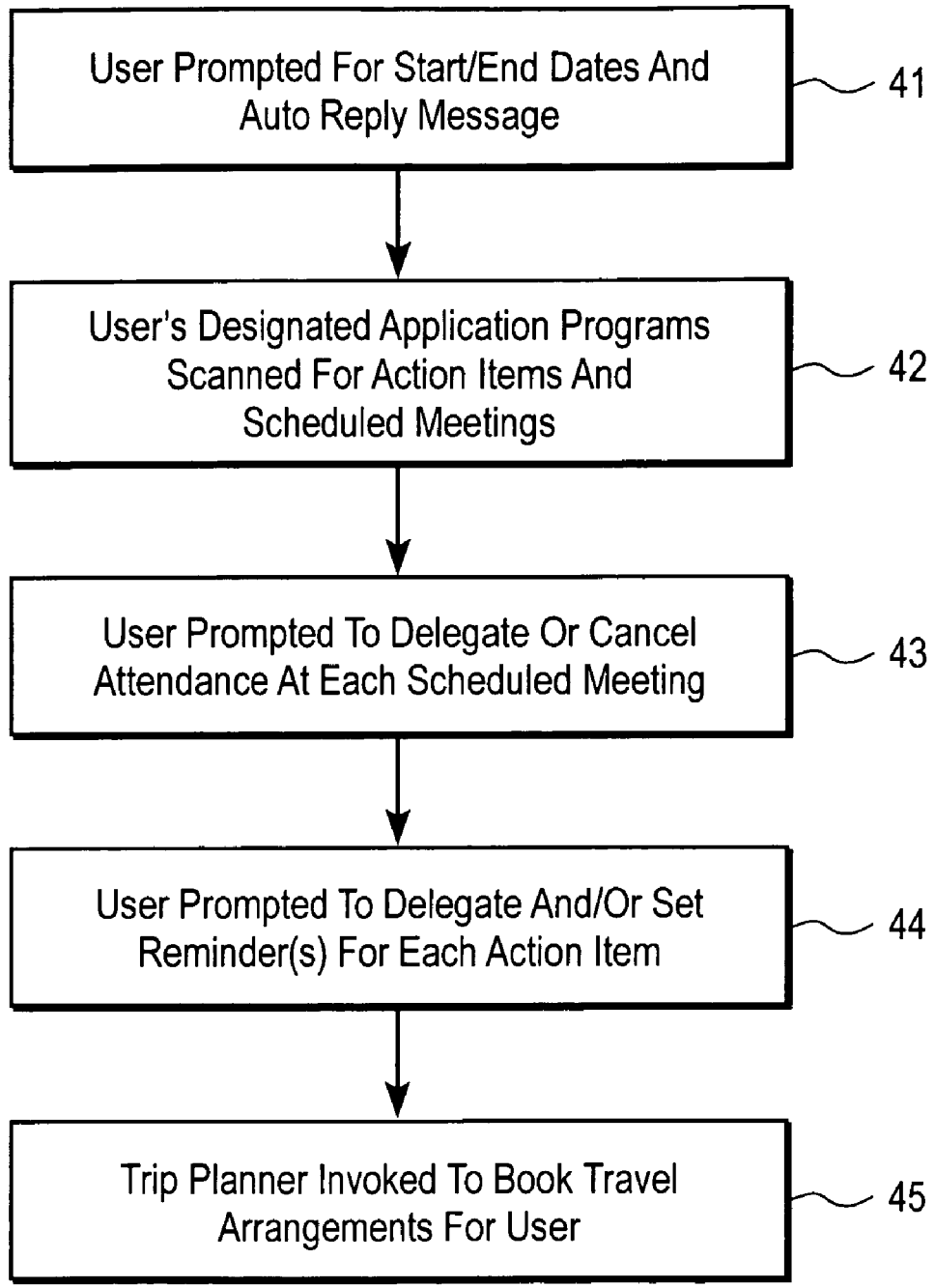
FIG. 4 illustrates an example method of operation for the system of FIG. 1.

FIG. 4 illustrates an example method of operation for the system of FIG. 1. The process begins at block 41 with a user being prompted to enter start and end dates for his trip, and also enter an auto-reply text message. This automatic prompt may result from the user invoking the OoOA tool, the company trip planner utility, or an attempt by the user to use the vacation or out-of-office facilities/features associated with the user's other applications (e.g., Microsoft® Outlook, Oracle® iProcurement, etc.). It is appreciated that each of these applications may not have any existing action items due during the relevant time period. Rather, the user may be reminded to nominate a delegate for approving purchases requests and other routine responsibilities that may or may not arise during the time period that the user is away from the office.

Next, certain designated application programs of the user are automatically scanned by the OoOA tool for any action items and/or meetings scheduled during the relevant period. The relevant period of time may include the user's actual time of absence from the office and preset time periods associated with specified tasks extending thereafter (block 42). In certain cases, the relevant time period may simply comprise the actual time that the user intends to be out of the office. Automatic scanning by the OoOA tool results in collection of a list of items, tasks, and/or meetings which are then presented to the user.

After the various application programs and systems have been scanned, the user is then prompted to delegate or cancel attendance at each scheduled meeting that the user has been invited to attend (block 43). Additionally, the user may be prompted to delegate and/or set a reminder for each action item collected during the scanning phase (block 44). Note that other possible choices or options for disposing each item/meeting listed may also be presented to the user. The user, for example, may be also prompted to assign delegates for tools and activities that may present items to him for authorization while he is away from the office.

Once the user has disposed of each item or meeting listed for delegation during the relevant period, the trip planner utility is invoked (block 45). In the example embodiment of FIG. 4 the user is required to dispose of each action item and meeting arising during the relevant time period prior to invoking the trip planner utility. That is, the trip planner utility of the company is unavailable to users who have not first completed the process of scanning their designated calendaring, messaging, notification, and reminder application programs. This ensures that meetings and action items are not inadvertently missed due to the unavailability of the user from the office.

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions. Elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. For instance, although functions and methods of various embodiments have been described as being embodied on an umbrella or gateway application running on a network node separate from various other specific applications/systems, it is appreciated that these same methods and functions may be embodied on an endpoint device of a user, an email server or client, a calendaring application, or a third party service application program accessible via a web-based browser. Accordingly, the specification and drawings are to be regarded in an illustrative rather than a restrictive sense.

We claim:

1. A method comprising:
scanning, by an automated tool, one or more application programs associated with a user, the one or more application programs including data indicative of one or more first action items calendared in a relevant time period that includes one or more days when the user intends to be out of the office and one or more second action items calendared in a time period extending beyond the one or more days when the user intends to be out of the office, the one or more first action items including at least one task due to be completed during the one or more days when the user intends to be out of the office, the one or more second action items including at least one task due to be completed within a predetermined period of time after the last of the one or more days that the user intends to be out of the office, the predetermined period of time specified by the user, the one or more application programs including an email client;

presenting the one or more first action items and the one or more second action items to the user via a user interface;

responsive to input received, electronically notifying each of one or more delegates correspondingly assigned to complete the one or more first action items and the one or more second action items; and setting, by the automated tool, an auto-reply message to be sent in reply to an incoming email message received during the one or more days when the user is out of the office.

2. The method of claim 1 further comprising setting, by the automated tool, an auto-reply message to be played in response to an incoming call directed to a telephone number of the user received during the one or more days when the user is out of the office.

3. The method of claim 1 further comprising precluding invoking of a trip planner utility until after the input has been received.

4. The method of claim 1 wherein the input comprises a list of the one or more delegates.

5. The method of claim 4 further comprising setting, by the automated tool, one or more calendar reminders for the user corresponding to the one or more first action items.

6. The method of claim 1 wherein the one or more first action items comprise a scheduled meeting that the user has been invited to attend.

7. The method of claim 1 wherein the one or more application programs further include data indicative of one or more authorization items associated with the user, and further comprising:

presenting the one or more authorization items to the user via the user interface; and responsive to additional input received, electronically notifying each of one or more proxies correspondingly assigned authority over the one or more authorization item.

8. A non-transitory computer-readable memory encoded with a computer program for managing reminders and delegating action items for a user operable to:

scan one or more application programs associated with the user, the one or more application programs including data indicative of one or more first action: items calendared in a relevant time period that includes one or more days when the user intends to be out of the office and one or more second action items calendared in a time period extending beyond the one or more days when the user intends to be out of the office, the one or more first action items including at least one task due to be completed during the one or more days when the user intends to be out of the office, the one or more second action items including at least one task due to be completed within a predetermined period of time after the last of the one or more days that the user intends to be out of the office, the predetermined period of time specified by the user;

present via a user interface a listing that includes the one or more first action items and, the one or more second action items, and one or more disposition commands associated with each of the one or more first and second action items;

responsive to input received from the user interface, execute a selected disposition command for each of the one or more first and second action items; and set an auto-reply message responsive to further input from the user, the auto-reply message to be sent in reply to an incoming email message received during the one or more days when the user is out of the office.

9. The computer-readable memory of claim 8 wherein the computer-readable memory is further operable to set an auto-reply message to be played in response to an incoming call directed to a telephone number of the user received during the one or more days when the user is out of the office.

10. The computer-readable memory of claim 8 wherein the computer-readable memory is further operable to invoke a trip planner utility that assists in making travel arrangements for the user during the one or more days when the user is out of the office.

11. The computer-readable memory of claim 8 wherein the one or more disposition commands comprises one of more messages sent to one or more delegates correspondingly nominated to perform the one or more first action items.

12. The computer-readable memory of claim 8 wherein the selected disposition command comprises setting an automated calendar reminder for the user.

13. The computer-readable memory of claim 8 wherein the one or more first action items comprise a scheduled meeting that the user has been invited to attend.

14. A system comprising:

one or more network nodes running one or more application programs that provide electronic calendaring or reminder functions for a user, one of the nodes including:

one or more processors; and a non-transitory memory comprising one or more instructions executable at the processors, the processors operable when executing the instructions to:

scan the one or more application programs for at least one first action item due in a relevant time period that includes one or more days when the user intends to be out of the office at least one second action item calendared in a time period extending beyond the one or more days when the user intends to be out of the office, the at least one first action item including at least one task due to be completed during the one or more days when the user intends to be out of the office, the at least one second action item including at least one task due to be completed within a predetermined period of time after the last of the one or more days that the user intends to be out of the office, the predetermined period of time specified by the user;

responsive to a first input received, delegate the at least one first action item and the at least one second action item to one or more proxies;

scan the one or more application programs for at least one authorization item associated with the user;

responsive to a second input received, delegate authority over the at least one authorization item to one or more persons during the one or more days when the user is out of the office; and wherein the one or more application programs include an email client, and wherein the one or more processors, when executing the instructions, are further operable to set an auto-reply message to be sent in reply to an incoming email message received during the one or more days when the user is out of the office.

15. The system of claim 14 wherein the relevant time period is predetermined with respect to the at least one first action item.

* * * * *